Oct. 30, 1934.   H. A. DOUGLAS   1,978,934
MOUNTING MEANS
Filed Nov. 25, 1932    4 Sheets-Sheet 1
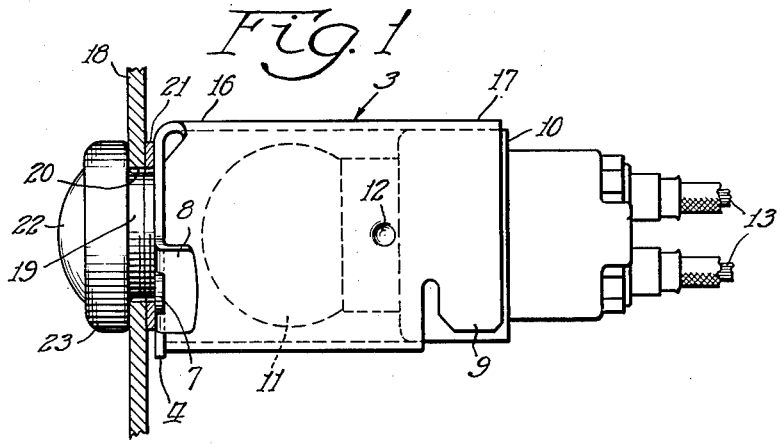
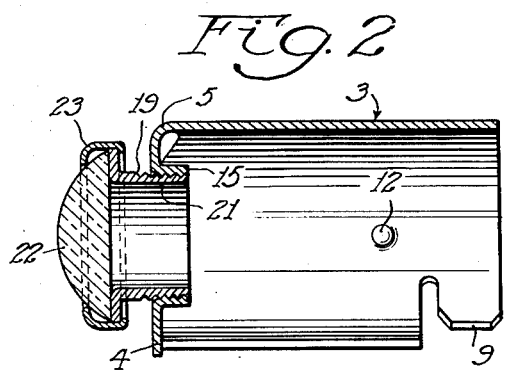
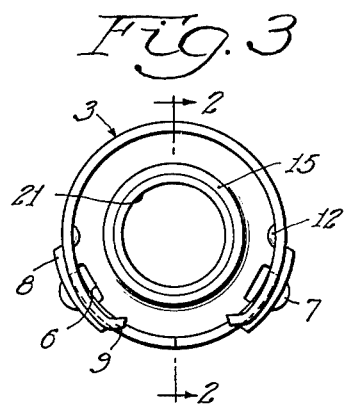
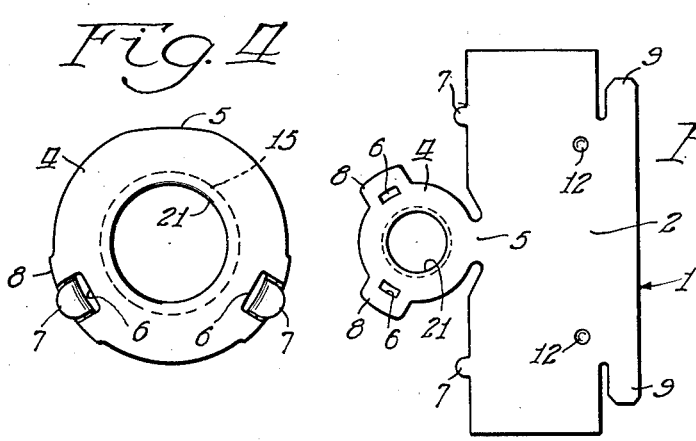
Inventor
Harry A. Douglas
By: Langdon Moore
Atty.

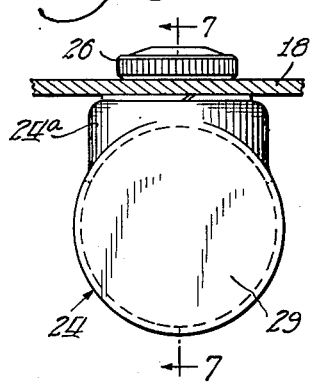
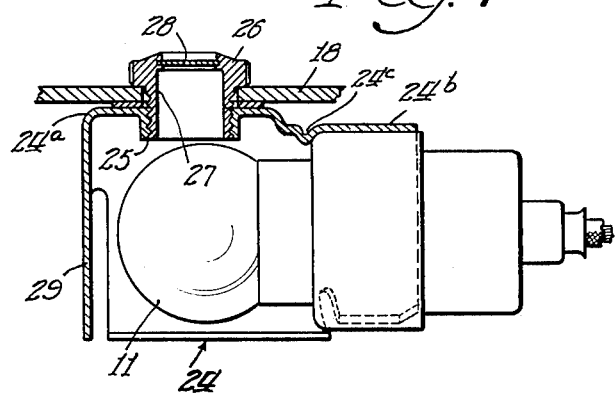
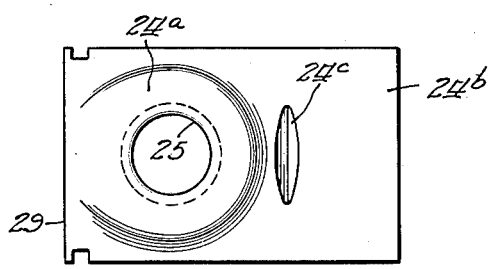
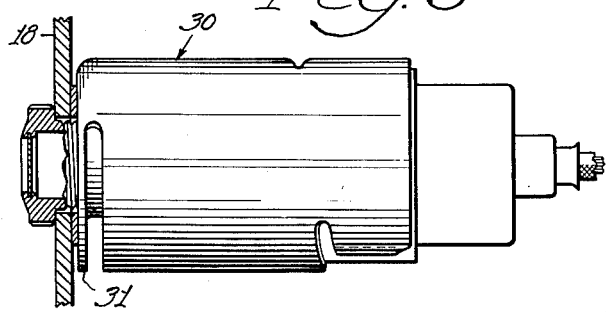

Oct. 30, 1934.                H. A. DOUGLAS                1,978,934
                              MOUNTING MEANS
                     Filed Nov. 25, 1932        4 Sheets-Sheet 3
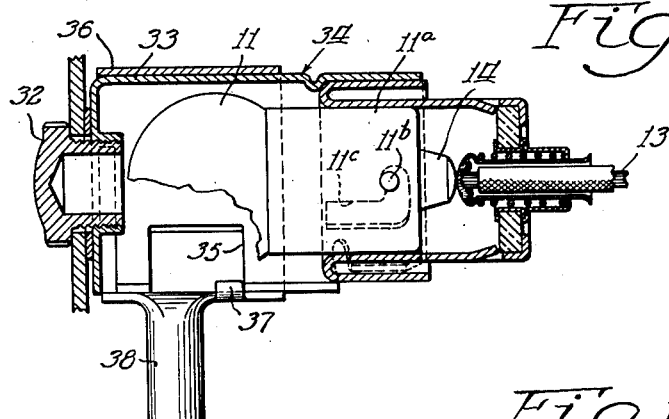
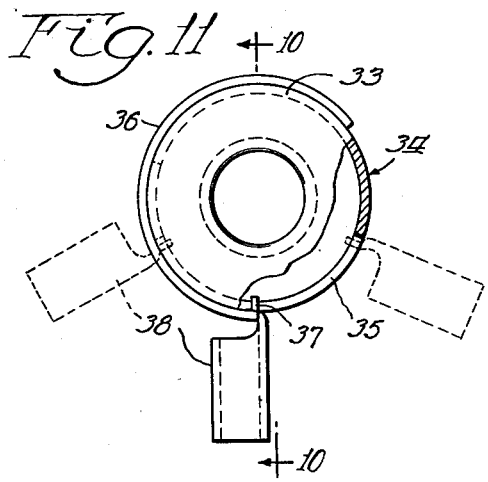
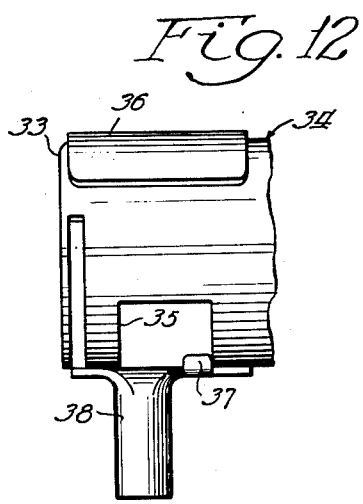
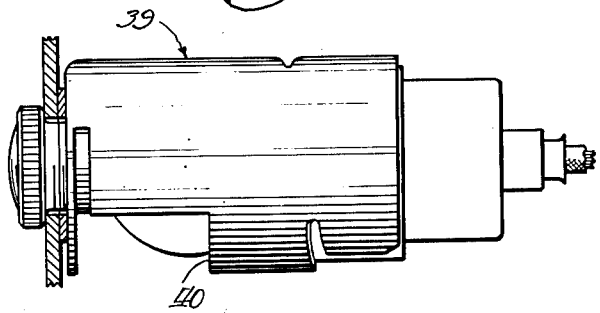
Inventor
Harry A. Douglas
By: Langdon Moore
                    Atty.

Oct. 30, 1934.   H. A. DOUGLAS   1,978,934
MOUNTING MEANS
Filed Nov. 25, 1932   4 Sheets-Sheet 4
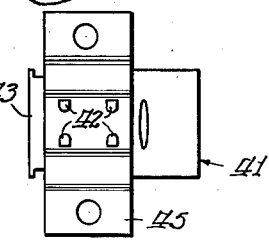
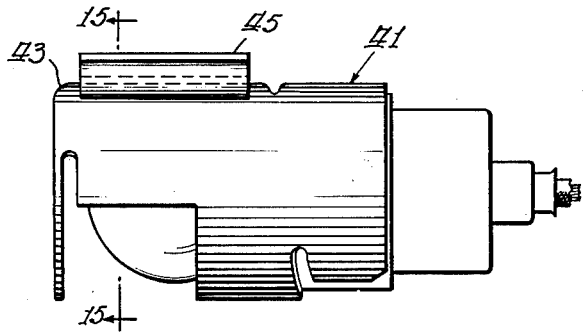
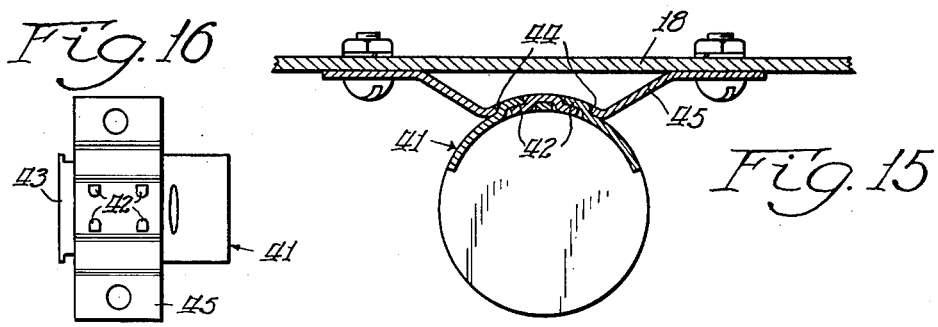
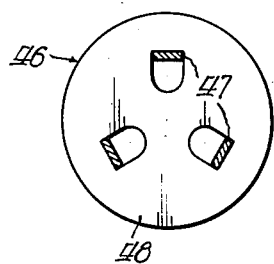
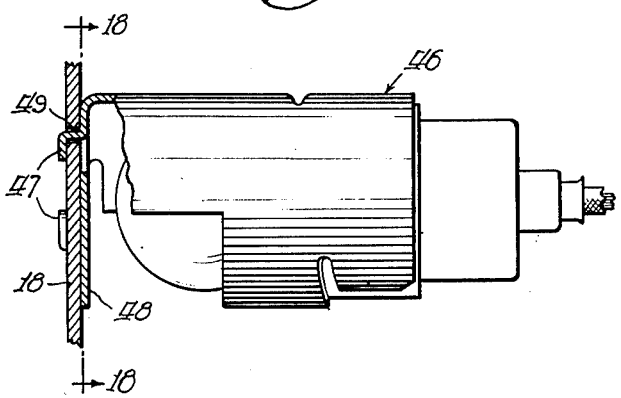
Inventor
Harry A. Douglas
By: Langdon Moore
Atty.

Patented Oct. 30, 1934

1,978,934

UNITED STATES PATENT OFFICE 1,978,934

MOUNTING MEANS

Harry A. Douglas, Bronson, Mich.

Application November 25, 1932, Serial No. 644,282

5 Claims. (Cl. 240—8.16)

This invention relates to mounting means more particularly for incandescent electric lamps.

The invention is of particular utility when employed in conjunction with dash lamps for automotive vehicles and the like, and, among other objects, aims to provide an improved and economical mounting which combines, in a one piece structure, both a retaining means for the lamp socket and a cowl for the lamp whereby the light thereof is suitably directed, as may be desired by the user.

Other objects and advantages will be apparent from the following description, taken together with the accompanying drawings, showing illustrative embodiments of my invention in which—

Figure 1 is a side elevation, parts being shown in section, showing one embodiment of my invention;

Figure 2 is a longitudinal sectional view of parts included in Figure 1 and being a section taken on the line 2—2 of Figure 3;

Figure 3 is an end view of the structure of Figure 2 taken from the right hand side;

Figure 4 is an end view of the structure of Figure 2 taken from the left hand side, parts being omitted;

Figure 5 is a development view on a somewhat reduced scale showing the blank for the housing of the previous figures;

Figure 6 is an end view of the modified structure of Figure 7;

Figure 7 is a longitudinal sectional view taken on the line 7—7 of Figure 6;

Figure 8 is a plan view of the housing shown in Figure 7, parts being omitted;

Figure 9 is a side elevation of another modified form, parts being shown in section;

Figure 10 is a longitudinal sectional view of a further modification and being a section taken on the line 10—10 of Figure 11;

Figure 11 is an end view of the housing of Figure 10 showing in dotted lines selective positions of the closure associated therewith;

Figure 12 is a fragmentary side elevation of the housing and closure shown in Figure 11.

Figure 13 is a side elevation of a further modification;

Figure 14 is a side elevation of a further modification;

Figure 15 is a cross section taken on the line 15—15 of Figure 14;

Figure 16 is a plan view somewhat reduced showing the bracket and housing of Figures 14 and 15;

Figure 17 is a side elevation of a further modification, parts being shown in section; and Figure 18 is an end view of the structure of Figure 17.

As best shown in Figure 5, the blank 1 is conveniently stamped out of a single piece of somewhat resilient metal such as brass. A portion 2 of the blank is bent to somewhat cylindrical form as shown in Figures 1 to 4, inclusive, to provide the split spring housing 3. The somewhat circular extension 4 of the portion 2 of the blank is shown bent perpendicular to the axis of the housing to form an end wall thereof and in addition to the portions 2 and 4 being connected by the neck 5, they may be further secured in the position described by slotting the portion 4 as at 6 and forming ears 7 on the portion 2 which are received through the slots 6 and clinched over the portion 4. Complementary ears 8 may also be formed on the portion 4 to lap the portion 2 thus forming a secure overlapping and interlocking engagement. Tongues 9 struck in the portion 2 of the blank at its end opposite the portion 4 may be slightly contracted when the blank is bent to cylindrical form to enhance the function of the housing 3 in resiliently retaining the socket 10 which is received in the housing together with a conventional incandescent lamp 11 carried by the socket. The housing may be indented as at 12 to limit insertion of the socket therein. The socket 10 may also, as is usual, carry the insulated current conductors 13 which, as shown in Figure 10, are spring pressed into engagement with the contacts 14 of the lamp. The lamp base 11a may have the usual bayonet pin 11b thereon which is received in the usual bayonet channel 11c in the socket.

As shown in Figures 1 to 5, inclusive, the end wall of the housing 3 formed by the circular extension 4 of the blank 1 is centrally perforated to provide an interiorly threaded sleeve 15. The end wall 4 of the housing and the cylindrical portion immediately adjacent thereto form a cowl portion 16 providing a cowl for the lamp 11 while the opposite end of the housing 3 forms the socket retaining portion 17 of the housing.

The entire housing with the lamp, socket and conductors carried thereby are adapted to be secured to a suitable support 18, perpendicularly thereto, which may be the dash or instrument panel of an automotive vehicle, and the means for effecting this mounting is desirably inclusive of an interengaging element integral with the cowl portion 16 of the housing. In Figures 1 to 5, inclusive, this interengaging element is represented by the sleeve 15 which threadedly receives therein the exteriorly threaded clamping nut 19. The clamping nut 19 passes through a suitable aperture 20 in the support 18 and the parts are then screwed together. If desired a spring washer 21 may be inserted between the clamped parts to guard against their being jarred loose.

The structure just described may be advantageously employed as a "tell-tale" light indicating, when the lamp 11 is energized, a certain prearranged signal as for example that the lubricating oil of the motor is properly circulating. For this purpose, as here shown, I make the clamping nut 19 hollow to provide a light passage 21 through the support into the cowl portion of the housing and this light passage is desirably crossed by a translucent member such as the glass bull's-eye 22 which may be red, green or any other desired color. To retain the bull's-eye 22 in position across the passage 21 through the clamping nut, the nut may be provided with a bezel cap 23 engaging the tapered edge of the bull's-eye. Thus the lamp 11 is securely mounted and at the same time fully protected while its light is suitably directed for the purpose described.

When it is desired to mount the lamp parallel with the support 18, for any reason, the housing 24 may have its cowl portion 24a perforated transversely to the axis of the housing as at 25 (Fig. 7) to form a sleeve similar to the sleeve 15 and which receives therein a clamping nut 26 which also passes through the support 18. The nut 26, like the nut 19, may be hollow to provide a light passage 27 and this passage may be crossed by a glass disc 28 suitably carried by the nut 26. In this instance, the end wall 29 of the housing while formed generally similarly to the portion 4 of the blank 1, need not be perforated. In this modification the socket retaining portion 24b of the housing 24 is desirably reduced in diameter to provide clearance for the lamp 11 past the sleeve 25. An indentation 24c limits insertion of the socket.

As shown in Figure 9, the housing 30 is generally similar to the housing 3 but with an end wall 31 similar to the end wall 29 of the housing 24 and may have this end wall 31 perforated to mount the housing on the support 18.

When it is desired to direct the light of the lamp 11 in another direction than through the clamping nut an imperforate clamping nut 32 may be used, as shown in Figure 10, and the cowl portion 33 of the housing 34 may be cut away as at 35 to provide a substantial light opening therein and the extent of this opening may be regulated by a movable closure 36 which is in the form of an incomplete ring snugly surrounding the housing and slidingly rotating on the cylindrical wall of the cowl portion 33 to overlap the opening 35 when desired. An inwardly struck lip 37 may ride the margin of the opening 35 to act as a guide and stop for the closure 36. The closure may be manipulated by a handle 38 integral therewith.

When the movable closure is not desired the housing 39 as shown in Figure 13 may have merely a light opening 40 therein for the same purpose as the light opening 35.

The housing 41, similar to the housing 39, may be mounted parallel with the support 18, as shown in Figures 14 to 16, inclusive, as by having prongs 42 struck out of the cowl portion 43 of the housing 41 transversely of its axis and passed through and clinched over slots 44 in a bracket 45 suitably fixed to the support 18. As a further modification the housing 46, otherwise similar to the housing 41, may have prongs 47 struck out of its end wall 48 to be passed through slots 49 in the support 18 and directly clinched thereover, thus again mounting the housing perpendicular to the support 18.

Such changes may be made as fall within the scope of the following claims without departing from the invention.

I claim:

1. Mounting means including a single piece of sheet metal bent to somewhat cylindrical form to provide a split spring housing comprising a cowl portion and a socket retaining portion, said cowl portion being formed in part by a generally circular extension of the sheet metal piece bent perpendicular to the axis of the housing; interengaging means upon the cowl portion to secure it over the end of the housing; a support; and means for securing the housing to the support, said means embodying an interengaging element integral with the circular extension of the housing.

2. Mounting means including a single piece of sheet metal bent to somewhat cylindrical form to provide a split spring housing comprising a cowl portion and a socket retaining portion, said cowl portion being formed in part by a generally circular extension of the sheet metal piece bent perpendicular to the axis of the housing; means for maintaining the cowl portion against the adjacent end of the housing; a support; and means for securing the housing to the support, said means embodying a threaded sleeve integral with the circular extension of the housing.

3. Mounting means including a single piece of sheet metal bent to somewhat cylindrical form to provide a split spring housing comprising a cowl portion and a socket retaining portion, said cowl portion being formed in part by a generally circular extension of the sheet metal piece bent perpendicular to the axis of the housing; interengaging tongues and slots provided for clinching the cowl portion over the adjacent end of the housing; a support; an interiorly threaded sleeve integral with the circular extension of the housing; and a clamping nut passing through the support and received in the sleeve.

4. Mounting means including a single piece of sheet metal bent to somewhat cylindrical form to provide a split spring housing comprising a cowl portion and a socket retaining portion, said cowl portion being formed in part by a generally circular extension of the sheet metal piece bent perpendicular to the axis of the housing, said circular portion provided with slots and said housing provided with tongues passing through said slots and clinched thereover, a support, an interiorly threaded sleeve integral with the circular extension of the housing, and a clamping nut passing through the support and received in the sleeve.

5. The structure of claim 4 wherein the said slots are formed in radial extensions of the cowl portion adapted to be clinched against the housing.

HARRY A. DOUGLAS.